United States Patent
Van De Stroet et al.

(10) Patent No.: US 10,946,869 B2
(45) Date of Patent: Mar. 16, 2021

(54) VEHICLE STEERING CONTROL SYSTEMS AND METHODS

(71) Applicant: Danfoss Power Solutions, Inc., Ames, IA (US)

(72) Inventors: Caleb Van De Stroet, Ames, IA (US); Zhekang Du, Ames, IA (US)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 210 days.

(21) Appl. No.: 16/178,983

(22) Filed: Nov. 2, 2018

(65) Prior Publication Data
US 2020/0139985 A1    May 7, 2020

(51) Int. Cl.
*B60W 50/035*    (2012.01)
*B60W 10/04*    (2006.01)
(Continued)

(52) U.S. Cl.
CPC .......... *B60W 50/035* (2013.01); *B60W 10/04* (2013.01); *B60W 10/184* (2013.01);
(Continued)

(58) Field of Classification Search
CPC .. B60W 50/035; B60W 10/04; B60W 10/184; B60W 30/18145; B60W 2540/12;
(Continued)

(56) References Cited

U.S. PATENT DOCUMENTS

| 4,702,358 A | 10/1987 | Mueller et al. |
| 4,949,823 A | 8/1990 | Coutant et al. |

(Continued)

FOREIGN PATENT DOCUMENTS

| DE | 102015107247 A1 | 11/2016 |
| EP | 0231160 A2 | 8/1987 |

(Continued)

OTHER PUBLICATIONS

Partial European Search Report for Serial No. 19203725.7 dated Apr. 2, 2020.

*Primary Examiner* — Michael V Kerrigan
(74) *Attorney, Agent, or Firm* — McCormick, Paulding & Huber PLLC

(57) ABSTRACT

According to the present disclosure, a system for providing steering control in a dual path machine includes a propulsion controller operatively connected to plants of the machine for driving ground contacting elements, the propulsion controller being configured to control steering of the dual path machine through drive signals sent to the plants, and a brake controller operatively connected to left and right brakes of the machine, the brake controller being configured to control steering of the machine by providing differential brake pressures to the left and right brakes. The system of the present disclosure provides redundant steering control by receiving an input signal at the brake controller with an (Continued)

indication of steering position, receiving an input signal at the brake controller with an indication of brake position, and providing a differential brake pressure to brakes of the dual path machine based on the steering input signal and brake input signal.

13 Claims, 4 Drawing Sheets

(51) Int. Cl.
*B60W 10/184* (2012.01)
*B60W 30/18* (2012.01)
(52) U.S. Cl.
CPC ... *B60W 30/18145* (2013.01); *B60W 2540/12* (2013.01); *B60W 2540/18* (2013.01); *B60W 2710/182* (2013.01); *B60W 2720/406* (2013.01)
(58) Field of Classification Search
CPC ....... B60W 2540/18; B60W 2710/182; B60W 2720/406; B62D 5/0484; B62D 11/04; B62D 11/08; B62D 11/003; B62D 11/001; B62D 11/24
See application file for complete search history.

(56) References Cited

U.S. PATENT DOCUMENTS

| | | |
|---|---|---|
| 7,583,036 B2 | 9/2009 | Kikuchi et al. |
| 7,784,568 B2 | 8/2010 | Petersen et al. |
| 2002/0096374 A1 | 7/2002 | Ryan |
| 2003/0089535 A1* | 5/2003 | Kanzler ............... B62D 11/183 180/9.44 |
| 2007/0012505 A1* | 1/2007 | Walter .................... H02P 25/22 180/444 |
| 2007/0088484 A1 | 4/2007 | Fujita |
| 2007/0164603 A1 | 7/2007 | Oehme |
| 2014/0145498 A1* | 5/2014 | Yamakado ............ B60W 10/08 303/3 |
| 2016/0347364 A1 | 12/2016 | Eavenson, Sr. et al. |
| 2018/0009470 A1 | 1/2018 | Meyer |

FOREIGN PATENT DOCUMENTS

| | | |
|---|---|---|
| EP | 1201487 A2 | 5/2002 |
| EP | 3392121 A1 | 10/2018 |
| FR | 2943027 A1 | 9/2010 |

\* cited by examiner

VEHICLE STEERING CONTROL SYSTEMS AND METHODS

TECHNICAL FIELD

The present disclosure relates to machines with steering systems and, more particularly, to steering systems for dual path vehicles.

BACKGROUND

Machines, such as off-highway vehicles, include systems for both driving and steering the machines across terrain. These systems may include separate dedicated propel and steering systems or may include propel systems that also serve as steering systems. For example, in the case of dual path (dual track) vehicles, the propel system also serves as the steering system with steering operations being achieved by driving the wheels/tracks on each side of the dual path vehicle at different speeds. In an emergency situation, however, such as when a motor or pump fails, steering control of the dual path vehicle may be lost entirely, causing the vehicle to veer from its intended course while coming to a stop.

SUMMARY

According to the present disclosure, a steering system for a dual path machine is provided. The dual path machine includes left and right ground contacting elements driven by left and right plants, respectively, and left and right brakes for applying brake forces to the left and right ground contacting elements, respectively. The steering system comprises a propulsion controller operatively connected to the left and right plants, and a brake controller operatively connected to the left and right brakes. The propulsion controller is configured to control steering of the dual path machine through drive signals sent to the left and right plants, and the brake controller is configured to control steering of the dual path machine by providing differential brake pressures to the left and right brakes.

According to the present disclosure, the steering system may include a steering sensor in communication with the brake controller for providing the brake controller with an indication of a position of a steering element of the dual path machine. The steering system may also include a brake sensor in communication with the brake controller for providing the brake controller with an indication of a position of a brake element of the dual path machine. The brake controller may provide differential brake pressures to the left and right brakes based on the position of the steering element and the position of the brake element.

According to the present disclosure, the steering system may be configured to switch steering control from the propulsion controller to the brake controller when a machine failure is detected. For example, the brake controller may be configured to detect actuation of the brake element of the dual path machine, the actuation indicating the machine failure. Alternatively, the brake controller may be configured to monitoring the propulsion system to detect faults therein, the propulsion system faults indicating the machine failure.

According to the present disclosure, a method for providing redundant steering control to a dual path machine comprises detecting, at a vehicle control system, whether a machine failure has occurred, and commanding steering through plants of a machine propulsion system if a machine failure is not detected or commanding steering through brakes of the dual path machine if a machine failure is detected.

According to the present disclosure, detecting, at the vehicle control system, whether a machine failure has occurred may comprise detecting whether a brake element of the dual path machine has been actuated, or may comprise monitoring the propulsion system of the dual path machine to detect faults therein.

According to the present disclosure, the method for providing redundant steering control to the dual path machine may further comprise receiving a steering input signal from a steering sensor providing an indication of steering position of a steering element of the dual path machine. The method may also comprise receiving a brake input signal from a brake sensor providing an indication of brake position of a brake element of the dual path machine. Redundant steering may be provided by applying a differential brake pressure to the brakes of the dual path machine, wherein the differential brake pressure may be based on the steering position of the steering element and the brake position of the brake element.

According to the present disclosure, a machine may comprise a body, left and right ground contacting elements, left and right plants, the left and right plants configured to drive the left and right ground contacting elements, respectively, and left and right brakes configured to apply brake forces to the left and right ground contacting elements, respectively. The machine may further comprise a steering element for commanding steering, a brake element for commanding braking, and a vehicle control system including a propulsion controller and a brake controller. The propulsion controller may be operatively connected to the left and right plants, the propulsion controller being configured to control steering of the machine through drive signals sent to the left and right plants. The brake controller may be operatively connected to the left and right brakes, the brake controller being configured to control steering of the machine by providing differential brake pressures to the left and right brakes.

According to the present disclosure, the machine may further comprise a steering sensor configured to provide the brake controller with an indication of a position of the steering element. The machine may also comprise a brake sensor configured to provide the brake controller with an indication of a position of the brake element. The brake controller may provide differential brake pressures to the left and right brakes based on the position of the steering element and the position of the brake element.

According to the present disclosure, the vehicle control system may also be configured to switch steering control from the propulsion controller to the brake controller when a machine failure is detected. The vehicle control system may be configured to detect whether a machine failure has occurred by detecting whether the brake element has been actuated or by monitoring the left and right plants to detect faults therein.

These and other objects, features and advantages of the present disclosure will become apparent in light of the detailed description of embodiments thereof, as illustrated in the accompanying drawings.

DETAILED DESCRIPTION

Before the various embodiments are described in further detail, it is to be understood that the invention is not limited to the particular embodiments described. It will be understood by one of ordinary skill in the art that the controllers, systems, and methods described herein may be adapted and modified as is appropriate for the application being addressed and that the controllers, systems, and methods described herein may be employed in other suitable applications, and that such other additions and modifications will not depart from the scope thereof.

Figure 1:
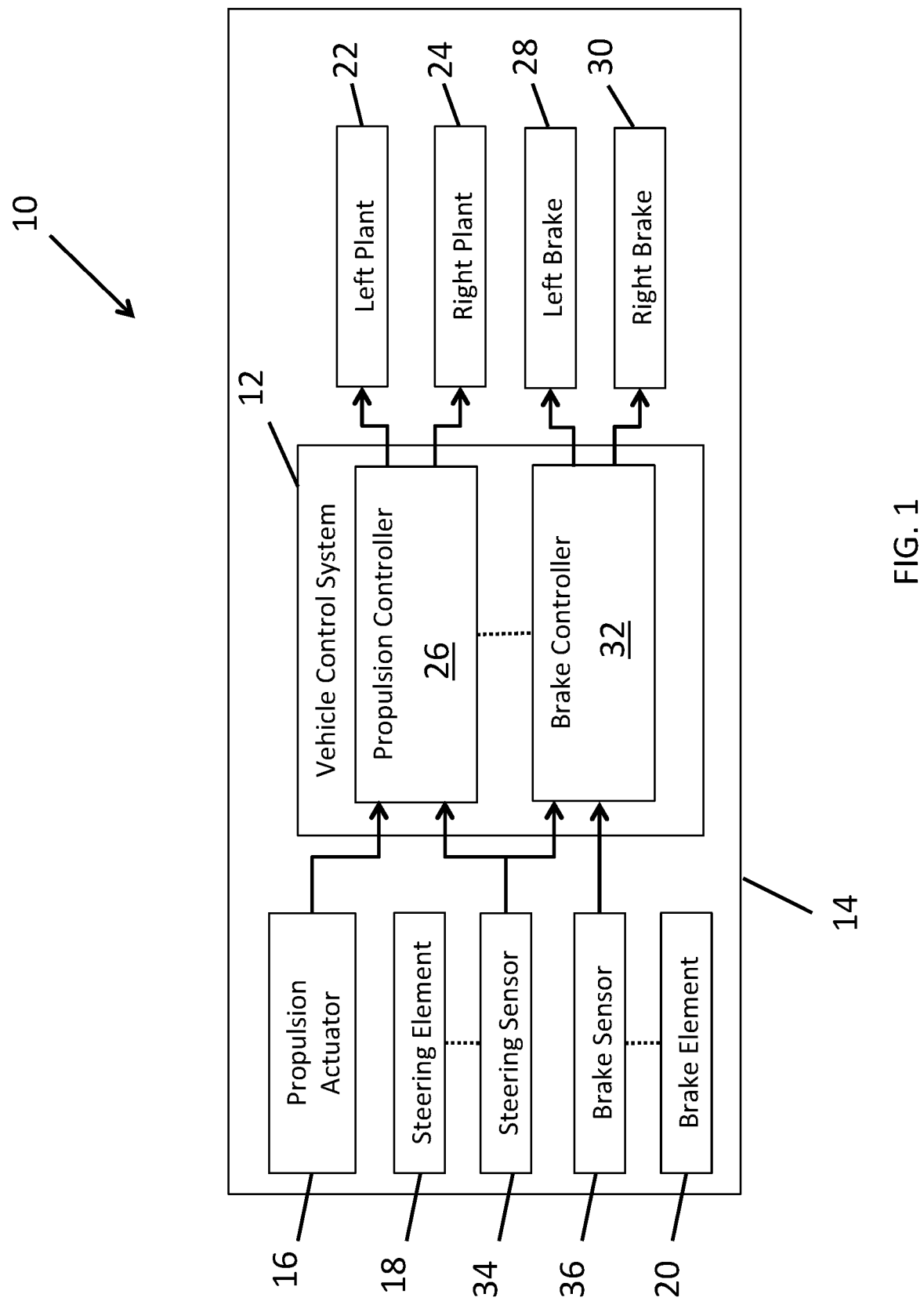
FIG. 1 is a schematic diagram of a machine comprising the vehicle control system according to the present disclosure.

Referring to FIG. 1, a machine 10 including a vehicle control system 12 according to the present disclosure is shown. The machine 10 may be any type of dual path (dual track) vehicle, such as, for example, a skid steer, forklift, bulldozer, self propelled windrower, self propelled baler, sugar cane harvester, or any other similar off-highway or all-terrain vehicle.

The machine 10 includes a body 14 housing the vehicle control system 12. The machine 10 also includes a propulsion actuator 16, a steering element 18 and a brake element 20 that are each operatively connected to the vehicle control system 12 and provide input thereto. The machine 10 includes a left plant 22 and a right plant 24, each of which is operatively connected to a propulsion controller 26 of the vehicle control system 12. The machine 10 further includes a left brake 28 and a right brake 30 that are each operatively connected to a brake controller 32 of the vehicle control system 12. The machine 10 also includes a steering sensor 34 configured to detect a degree of actuation of the steering element 18 and to provide the vehicle control system 12 with an indication thereof and a brake sensor 36 configured to detect actuation of the brake element 20 and to provide the vehicle control system 12 with an indication thereof.

The left plant 22 includes motors, pumps, and/or other similar hydraulic and/or mechanical elements that are operatively coupled to one or more wheels, treads, and/or other similar driving elements on a left side of the machine 10 to drive said wheels, treads, and/or other similar driving elements on the left side of the machine 10. The right plant 24 includes motors, pumps, and/or other similar hydraulic and/or mechanical elements that are operatively coupled to one or more wheels, treads, and/or other similar driving elements on a right side of the machine 10 to drive said wheels, treads, and/or other similar driving elements on the right side of the machine 10. The left plant 22 and right plant 24 are configured to propel the body 14 across terrain and also to provide steering for the machine 10 by being driven at different speeds.

The propulsion controller 26 of the vehicle control system 12 receives input from the propulsion actuator 16 and steering element 18, through the steering sensor 34, and controls the left plant 22 and right plant 24 to drive and steer the machine 10 in accordance with the input. The brake controller 32 of the vehicle control system 12 receives input from the brake element 20 through the brake sensor 36, and the steering sensor 34 and controls the left brake 28 and right brake 30 to provide redundant steering during braking according to the present disclosure.

The propulsion actuator 16 and the steering element 18 may be any suitable known actuators for imparting driving and steering movement, respectively, to the machine 10 including any known operator control for the various machines listed above. For example, the propulsion actuator 16 may include one or more joysticks, pedals, or any other similar operator controls. Similarly, the steering element 18 may include a steering wheel, one or more joysticks, pedals, or any other similar operator controls. The brake element 20 may also be any suitable known actuator for imparting braking control to the machine 10 including any known operator control for the various machines listed above. For example, the brake element 20 may include a pedal, a handbrake, or any other similar operator controls.

The vehicle control system 12, including the propulsion controller 26 and brake controller 32, the left plant 22, the right plant 24, the left brake 28, the right brake 30, and the various actuators and sensors, including the propulsion actuator 16, steering element 18, brake element 20, steering sensor 34, and brake sensor 36, as well as other various subsystems of the machine 10, may be connected to one another over a Controller Area Network (CAN or CAN bus) or other similar network that allows the various control systems, controllers, plants, brakes, actuators, sensors, and various other subsystems, microprocessors, and/or any other devices connected to the CAN or other similar network to communicate with one another using CAN or other communication protocols known in the art.

The vehicle control system 12, including the propulsion controller 26 and brake controller 32, includes all of the necessary electronics, software, memory, storage, databases, firmware, logic/state machines, microprocessors, communication links, and any other input/output interfaces to perform the functions described herein and/or to achieve the results described herein. For example, the vehicle control system 12, propulsion controller 26, and/or brake controller 32, may include, or be in communication with, one or more processors and memory, which may include system memory, including random access memory (RAM) and read-only memory (ROM). Suitable computer program code may be provided to the vehicle control system 12, propulsion controller 26, and/or brake controller 32 for executing numerous functions, including those discussed in connection with the brake controller 32 and propulsion controller 26.

The one or more processors may include one or more conventional microprocessors and may also include one or more supplementary co-processors such as math co-processors or the like. The one or more processors may be configured to communicate with other networks and/or devices such as servers, other processors, computers, cellular telephones, tablets and the like.

The one or more processors may be in communication with the memory, which may comprise magnetic, optical and/or semiconductor memory, such as, for example, random access memory ("RAM"), read only memory ("ROM"), flash memory, optical memory, or a hard disk drive memory. Memory may store any data and/or information typically found in computing devices, including an operating system, and/or one or more other programs (e.g., computer program code and/or a computer program product) that are stored in a non-transitory memory portion and adapted to direct the vehicle control system 12, including the propulsion controller 26 and brake controller 32, to perform according to the various embodiments discussed herein. The propulsion controller 26, brake controller 32, and/or portions thereof, and/or any other programs may be stored, for example, in a compressed format, an uncompiled and/or an encrypted format, and may include computer program code executable by the one or more processors. The executable instructions of the computer program code may be read into a main memory of the one or more processors from a non-transitory computer-readable medium other than the memory. While execution of sequences of instructions in the program causes the one or more processors to perform the process steps described herein, hard-wired circuitry may be used in place of, or in combination with, executable software instructions for implementation of the processes of the present invention. Thus, embodiments of the present invention are not limited to any specific combination of hardware and software.

For example, the methods and systems discussed herein may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as providing workflow analysis. In an embodiment, an application of executable code may be a compilation of many instructions, which may be distributed over several different code partitions or segments, among different programs, and across several devices.

For example, although the propulsion controller 26 and brake controller 32 are shown in FIG. 1 as being integral systems of the vehicle control system 12, the propulsion controller 26 and/or brake controller 32 may instead be separate components, including housings that house all of the necessary processors, memory, and the like to provide propulsion control and/or brake control according to the present disclosure. The separate propulsion controller 26 and/or brake controller 32 may be operatively connected to one another and/or the vehicle control system 12 over the CAN bus or other similar network. Additionally, although the propulsion controller 26 and brake controller 32 have been shown and described herein as separate controllers for simplicity, the propulsion controller 26 and brake controller 32 may be formed as a single controller that provides the functionality of both the propulsion controller 26 and the brake controller 32 as described herein.

The term "computer-readable medium" as used herein refers to any medium that provides or participates in providing instructions and/or data to the one or more processors of the vehicle control system 12, including the propulsion controller 26 and brake controller 32, (or any other processor of a device described herein) for execution. Such a medium may take many forms, including but not limited to, non-volatile media or memory and volatile memory. Non-volatile memory may include, for example, optical, magnetic, or opto-magnetic disks, or other non-transitory memory. Volatile memory may include dynamic random access memory (DRAM), which typically constitutes the main memory or other transitory memory.

Figure 2:
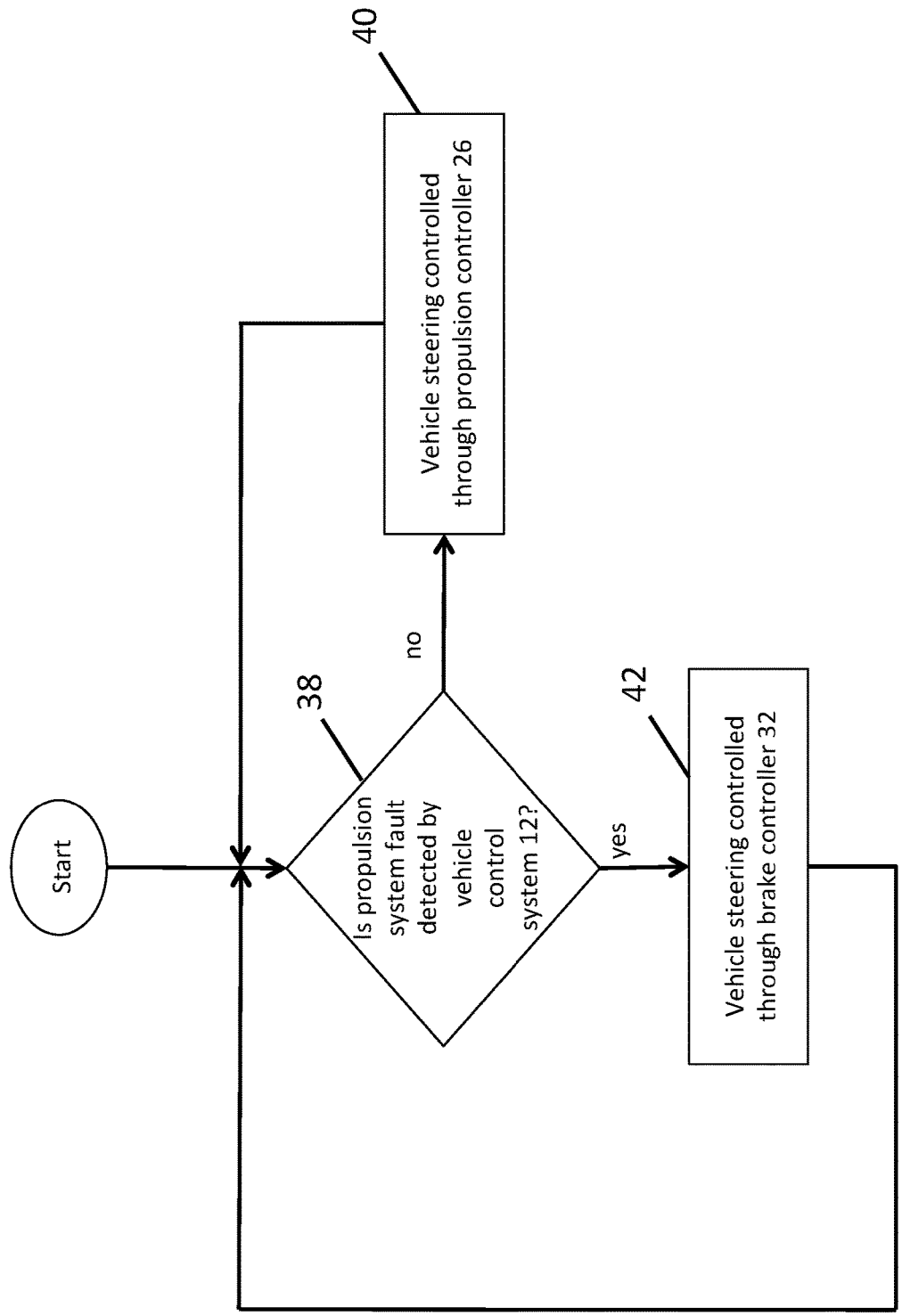
FIG. 2 is a schematic control diagram for providing redundant steering control in the machine of FIG. 1.

FIG. 2 illustrates an exemplary method for implementing the emergency steering control of the present disclosure during operation of the machine 10, shown in FIG. 1. For example, during operation of the machine 10, the vehicle control system 12 may evaluate whether a propulsion system fault is detected at step 38. In order to determine if a propulsion system fault is detected, the vehicle control system 12 monitors the left plant 22 and right plant 24, shown in FIG. 1, for proper operation of the motors, pumps, and/or other similar hydraulic and/or mechanical elements thereof. For example, the machine 10, shown in FIG. 1, may include various sensors in communication with the vehicle control system 12 that monitor operation of one or more of these elements. The vehicle control system 12 may also monitor proper operation of one or more of the elements of the left plant 22 and right plant 24, shown in FIG. 1, at the propulsion controller 26 by reading a current, inductance, or other similar control signal at the propulsion controller 26 to determine if the current, inductance, or other similar control signal varies outside a normal operating range. A variation outside the normal operating range may be indicative of failure of an element of the respective plant.

If the vehicle control system 12 determines that there is not a fault in the propulsion system at step 38, the vehicle control system 12 controls steering of the machine 10 through the propulsion controller 26 at step 40. This steering control through the propulsion controller 26 is achieved in the conventional manner for dual path vehicles by controlling the left plant 22 and right plant 24, shown in FIG. 1, to drive the wheels/tracks on each side of the machine 10 at different speeds using input from the propulsion actuator 16 and steering sensor 34, which measures position of the steering element 18 to provide an indication of desired steering.

Alternatively, if the vehicle control system 12 determines that there is a fault in the propulsion system at step 38, the vehicle control system 12 controls steering of the machine 10 through the brake controller 32 at step 42, since failure of an element of the propulsion system causes a loss of steering control through the propulsion controller 26. To control vehicle steering through the brake controller 32, the vehicle control system 12 uses input from the steering sensor 34, which measures steering element position, e.g. steering wheel position, and brake sensor 36, which measures brake element position, e.g. brake pedal position, to apply a differential pressure to each wheel/track on each side of the machine 10 through the left brake 28 and right brake 30. For example, the brake controller 32 may apply the differential pressures to the left brake 28 and right brake 30 according to the following equations:

$$Press_{Left}=POS_{brake}+POS_{Steer}$$

$$Press_{Right}=POS_{brake}-POS_{Steer}$$

where:

$Press_{Left}$ is the differential pressure applied to the left brake 28;

$Press_{Right}$ is the differential pressure applied to the right brake 30;

$Pos_{brake}$ is the brake element position as measured by the brake sensor 36; and $Pos_{Steer}$ is the steering element position as measured by the steering sensor 34.

Although the equations above are provided for exemplary purposes, in practice, the equations for determining the differential brake pressures may include various gains and/or dead bands to achieve a desired level of differential braking.

The differential brake pressure commands to the left brake 28 and right brake 30 cause the brakes 28, 30 to slow down one side of the machine 10 faster than the other side, thereby providing a redundant form of steering through the brake controller 32 in the case of an emergency where steering is lost through the propulsion controller 26.

Figure 3:
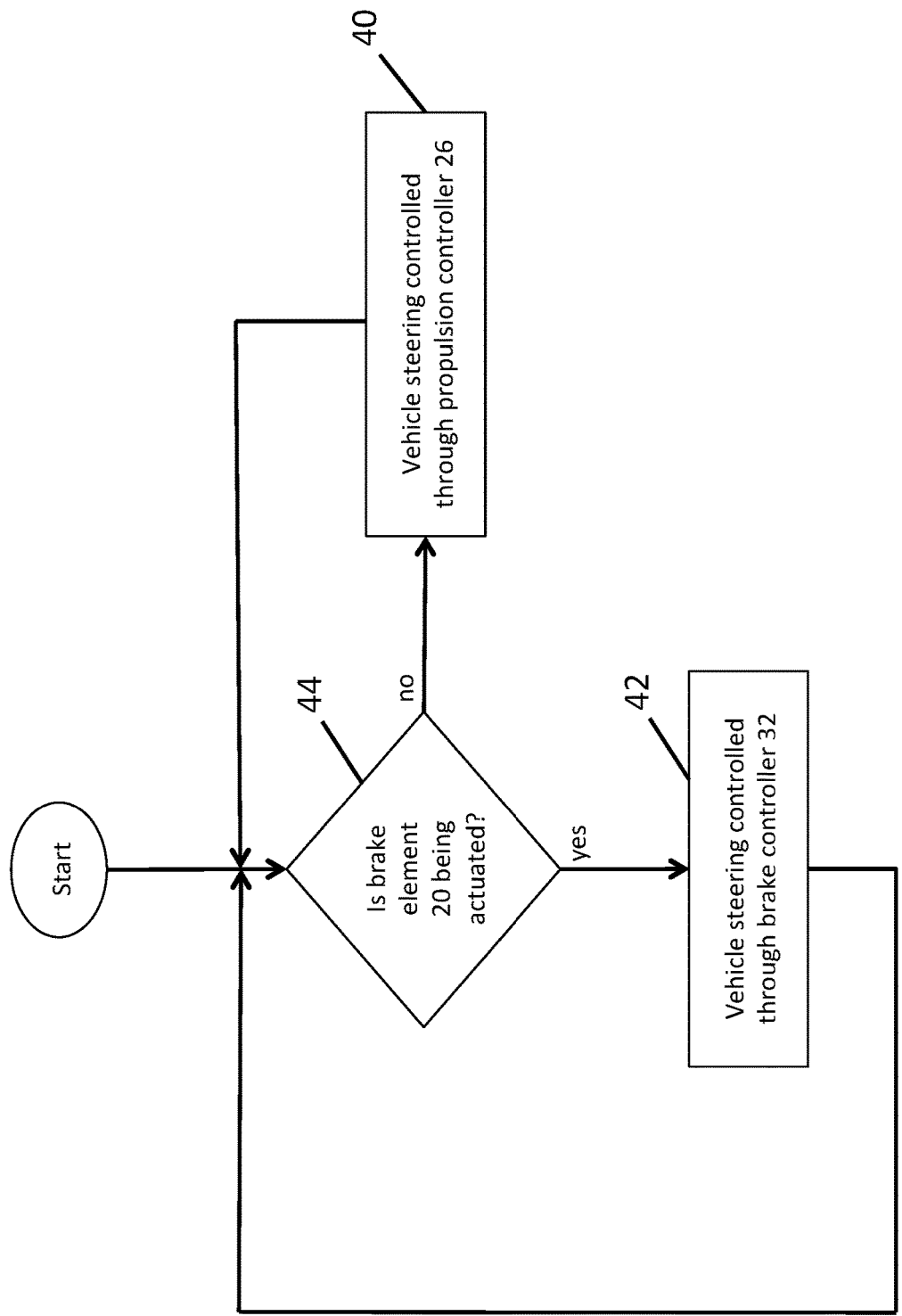
FIG. 3 is a schematic control diagram for providing redundant steering control in the machine of FIG. 1.

Referring to FIG. 3, wherein like numerals represent like elements, another exemplary method for implementing the emergency steering control of the present disclosure during operation of the machine 10 is shown. As seen in FIG. 3, rather than monitoring the propulsion system for faults therein, the vehicle control system 12 instead monitors for whether or not the brake element 20 is being actuated through the brake sensor 36 at step 44. If vehicle control system 12 determines that the brake element is not being actuated at step 44, the vehicle control system 12 controls steering of the machine 10 through the propulsion controller 26 at step 40 in the same manner described above in connection with FIG. 2. Alternatively, if the vehicle control system 12 determines that the brake element is being actuated at step 44, the vehicle control system 12 controls steering of the machine 10 through the brake controller 32 at step 42 in the same manner described above in connection with FIG. 2. In dual path machines, the brakes are typically only used in emergency situations, with deceleration of the machine typically being controlled through the propulsion controller 26. Thus, actuation of the brake element 20 may be indicative of an emergency situation and, therefore, the vehicle control system 12 may implement steering control through the brake controller 32 any time that the vehicle control system 12 detects that the brake is being actuated.

Figure 4:
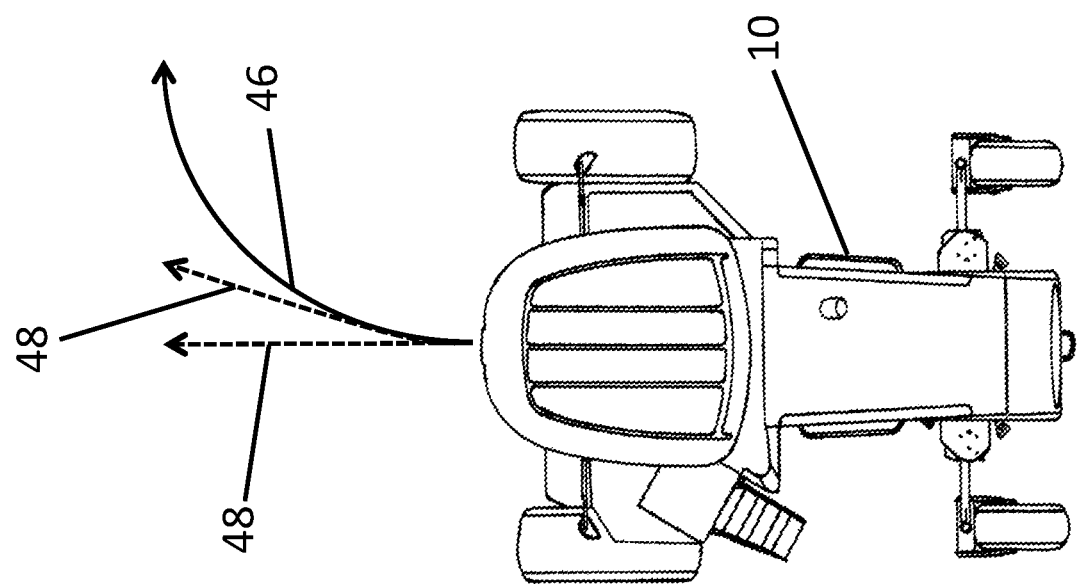
FIG. 4 is a top view of the machine of FIG. 1 during operation.

Referring to FIG. 4, the machine 10, illustrated as an exemplary self-propelled windrower, is shown while moving and turning to follow an intended path 46 at the time that steering through the propulsion controller 26 is lost, for example, due to a pump or motor failure in the left plant 22 or right plant 24. The vehicle control system 12, shown in FIG. 1, of the present disclosure advantageously allows the machine 10 to continue following the intended path 46, or closely thereto, while coming to a stop by providing the redundant steering through the brake controller 32 as described above. Absent this redundant steering, the machine 10 would veer from the intended path 46 along an unintended path 48 while coming to a stop. While there are situations where this unintended veering might not matter, for example, where the machine 10 is operating in a field, there are many situations where veering from the intended path 46 could result in serious injury, death, and/or damage, such as when the machine 10 is operating on a road, near buildings or other structures, near a cliff or other hazard and/or any other similar operating situations.

Thus, the vehicle control system 12 of the present disclosure advantageously provides redundant steering control while braking for a dual path machine that allows an operator to continue steering the machine in the case of an emergency while bringing the machine to a stop. Additionally, since the vehicle control system 12 still uses the steering element as input for providing the redundant steering control, the redundant steering control is advantageously intuitive for the operator of the machine to engage.

While various embodiments have been described in the present disclosure, it will be appreciated by those of ordinary skill in the art that modifications can be made to the various embodiments without departing from the spirit and scope of the invention as a whole. Accordingly, the particular embodiments described in this specification are to be taken as merely illustrative and not limiting.

What is claimed is:

1. A steering system for a dual path machine that includes left and right ground contacting elements driven by left and right plants, respectively, and left and right brakes for applying brake forces to the left and right ground contacting elements, respectively, the steering system comprising:
    a propulsion controller operatively connected to the left and right plants, the propulsion controller configured to control steering of the dual path machine through drive signals sent to the left and right plants; and
    a brake controller operatively connected to the left and right brakes, the brake controller configured to control steering of the dual path machine by providing differential brake pressures to the left and right brakes;
    wherein the steering system is configured to switch steering control from the propulsion controller to the brake controller when a machine failure is detected; and
    wherein the brake controller is configured to detect actuation of a brake element of the dual path machine, the actuation indicating the machine failure.

2. The steering system according to claim 1, further comprising a steering sensor in communication with the brake controller, the steering sensor configured to provide the brake controller with an indication of a position of a steering element of the dual path machine.

3. The steering system according to claim 2, further comprising a brake sensor in communication with the brake controller, the brake sensor configured to provide the brake controller with an indication of a position of the brake element of the dual path machine.

4. The steering system according to claim 3, wherein the brake controller is configured to provide differential brake pressures to the left and right brakes based on the position of the steering element and the position of the brake element.

5. A method for providing redundant steering control to a dual path machine, the method comprising:
    detecting, at a vehicle control system, whether a machine failure has occurred;
    commanding steering, by the vehicle control system, through plants of a machine propulsion system if a machine failure is not detected; and
    commanding steering, by the vehicle control system, through brakes of the dual path machine if a machine failure is detected;
    wherein detecting, at the vehicle control system, whether a machine failure has occurred comprises detecting whether a brake element of the dual path machine has been actuated.

6. The method according to claim 5, further comprising: receiving a steering input signal from a steering sensor providing an indication of steering position of a steering element of the dual path machine.

7. The method according to claim 6, further comprising: receiving a brake input signal from a brake sensor providing an indication of brake position of the brake element of the dual path machine.

8. The method according to claim 7, further comprising: providing a differential brake pressure to the brakes of the dual path machine.

9. The method according to claim 8, wherein the differential brake pressure is based on the steering position of the steering element and the brake position of the brake element.

10. A machine comprising:
    a body;
    left and right ground contacting elements;
    left and right plants, the left and right plants configured to drive the left and right ground contacting elements, respectively;

left and right brakes configured to apply brake forces to the left and right ground contacting elements, respectively;
a steering element for commanding steering;
a brake element for commanding braking; and
a vehicle control system including a propulsion controller and a brake controller,
wherein the propulsion controller is operatively connected to the left and right plants, the propulsion controller being configured to control steering of the machine through drive signals sent to the left and right plants;
wherein the brake controller is operatively connected to the left and right brakes, the brake controller configured to control steering of the machine by providing differential brake pressures to the left and right brakes;
wherein the vehicle control system is configured to detect actuation of the brake element, the actuation indicating a machine failure, and to switch steering control from the propulsion controller to the brake controller upon detection of the machine failure.

11. The machine according to claim 10, further comprising a steering sensor in communication with the vehicle control system, the steering sensor configured to provide the brake controller with an indication of a position of the steering element.

12. The machine according to claim 11, further comprising a brake sensor in communication with the vehicle control system, the brake sensor configured to provide the brake controller with an indication of a position of the brake element.

13. The machine according to claim 12, wherein the brake controller is configured to provide differential brake pressures to the left and right brakes based on the position of the steering element and the position of the brake element.

* * * * *